W. T. HANNA.

METHOD OF FEEDING FUEL IN BLAST FEED STOKERS.

APPLICATION FILED FEB. 20, 1913.

Reissued June 30, 1914.

13,761.

2 SHEETS—SHEET 1.

WITNESSES.

J. R. Keller

John F. Hill

INVENTOR.

William T. Hanna by Ralph C. Parrell

Atty

W. T. HANNA.

METHOD OF FEEDING FUEL IN BLAST FEED STOKERS.

APPLICATION FILED FEB. 20, 1913.

Reissued June 30, 1914.

13,761.

2 SHEETS—SHEET 2.

WITNESSES.

J. R. Keller

John F. Hill

INVENTOR.

William T. Hanna by Ralph C. Parrott

Atty

UNITED STATES PATENT OFFICE.

WILLIAM T. HANNA, OF CINCINNATI, OHIO.

METHOD OF FEEDING FUEL IN BLAST-FEED STOKERS.

13,761. Specification of Reissued Letters Patent. Reissued June 30, 1914.

Original No. 984,662, dated February 21, 1911, Serial No. 467,357. Application for reissue filed February 20, 1913. Serial No. 749,745.

*To all whom it may concern:*

Be it known that I, WILLIAM T. HANNA, a citizen of the United States, residing at Cincinnati, in the county of Hamilton, State of Ohio, have invented new and useful Improvements in the Method of Feeding Fuel in Blast-Feed Stokers, of which the following is a specification.

In blast feed stokers the coal usually varying in size from the smallest particles up to lumps three inches or more in diameter, is brought within range of the blast either in a stream or in charges, and the blast engages the fine particles and the coarse lumps with like pressure. The result is that the fine particles are driven farther into the fire box than the coarser lumps, and that the fuel bed is largely composed of coarse coal at the back and fine coal at the front or flue end, the intervening part being graduated from coarse to fine. If the blast is powerful some of the finer particles pass into the flue without being consumed; if the blast is weak the front of the fire box is insufficiently fed. It is desirable to have the fine and the coarse coal distributed with practical uniformity, and it is especially desirable to avoid delivering an undue proportion of the fine coal at the flue end of the fire box.

The object of my invention is to provide a method whereby the delivery of the fine and the coarse coal may be separately controlled, and whereby they may be mingled in the fire box with practical uniformity, and my invention consists in the method hereinafter described and claimed.

Figure 1:
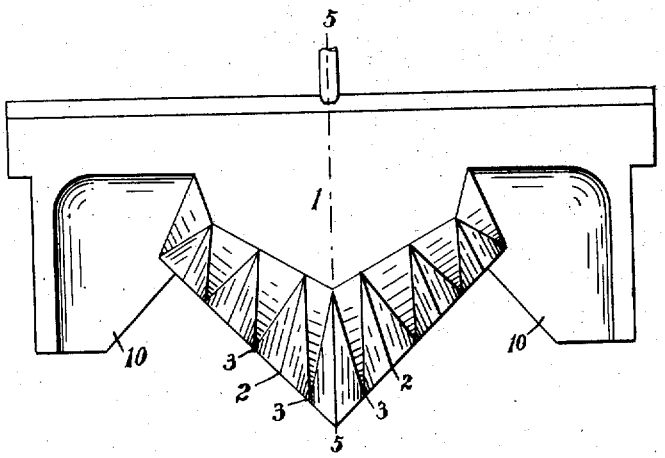
Figure 4:
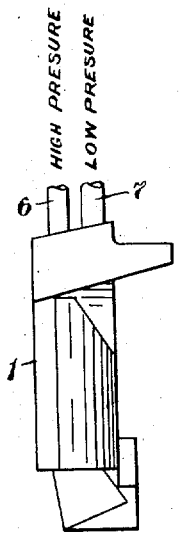
Figure 2:
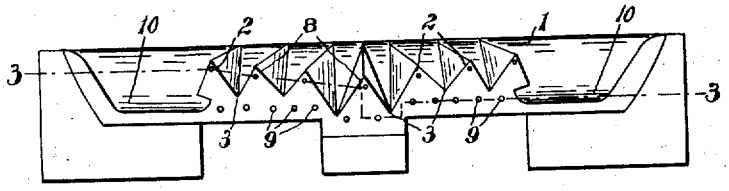
Figure 5:
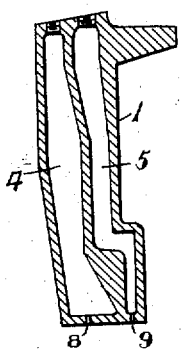
Figure 3:
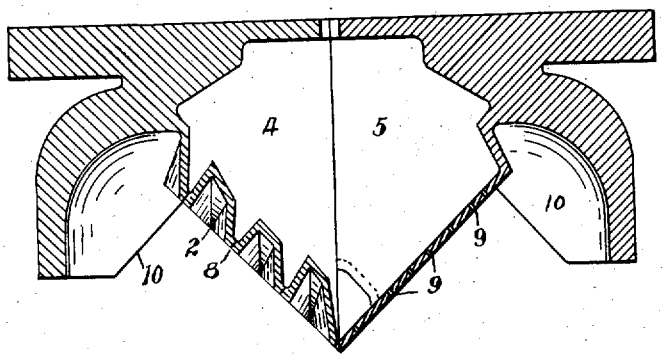
Figure 6:
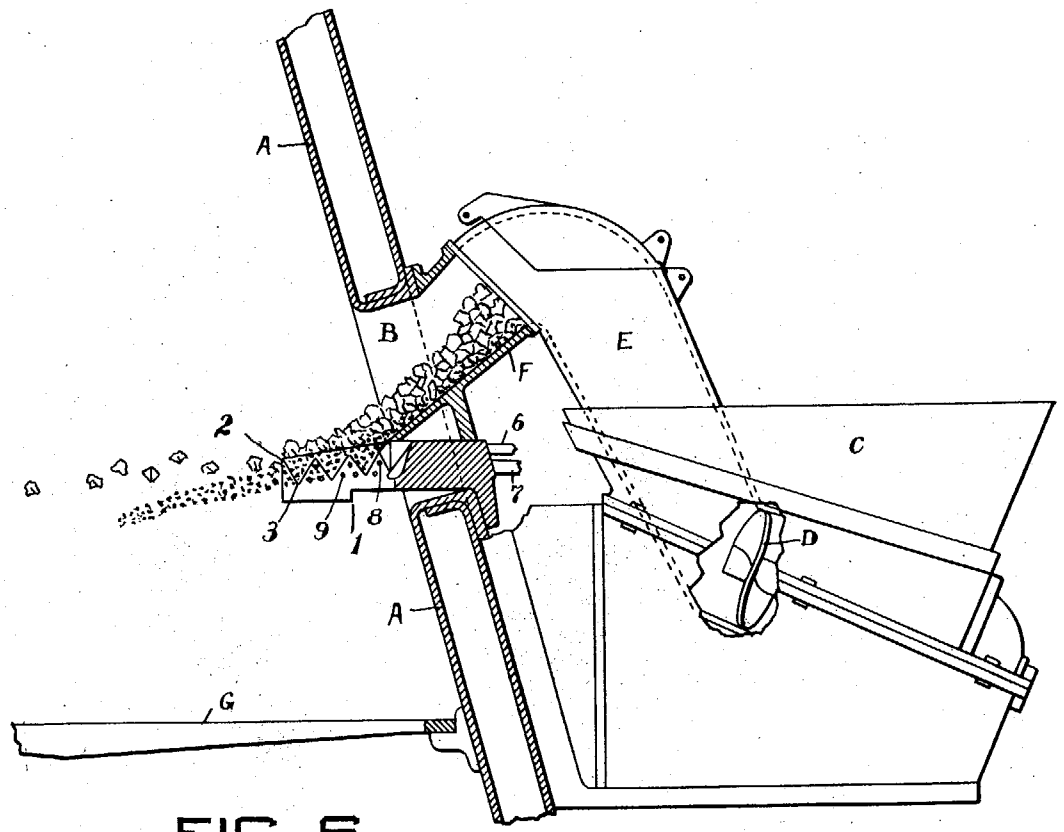

In the drawings Figure 1 is a top plan view of a blast casing adapted for use in carrying out my invention; Fig. 2 is a front elevation of the same; Fig. 3 a horizontal section on the line 3—3 of Fig. 2; Fig. 4 a side elevation; Fig. 5 a vertical section on the line 5—5 of Fig. 1; and Fig. 6 a view partly in side elevation and partly in section, showing the mechanism in its operative relation to a furnace.

A denotes the front of the fire box of a locomotive engine, B the fuel opening. C a fuel hopper, D a feed screw mounted in a suitable casing beneath the hopper, E a fuel conduit leading from the delivery end of the feed screw casing to a feed chute F, and G the grate bar. These parts correspond in a general way to mechanism described and claimed in my co-pending application, Serial No. 505,958, filed July 6, 1909, and constitute no part of the invention herein claimed.

The reference numeral 1 denotes the blast casing, which also forms the spreading plate 2, 2, a series of sloping and diverging ridges on the delivery face thereof forming sloping and deepening channels 3, 4 and 5 steam chambers in the blast casing, 6 and 7 steam pipes leading respectively to steam chambers 4 and 5, 8 steam exits in the apices of the ridges and leading from the upper steam chamber 4, 9 steam exits below the bottoms of the channels and leading from steam chamber 5, 10 sloping faces adapted to direct any coal, which may reach them, into range of the blast. The series of ridges, 2, 2, form a sort of comb for separating the coal.

In operation the coal is fed by any suitable mechanism to the front upper edge of the blast casing. The finer coal falls into the channels and as it is discharged from the lower ends thereof comes in range of blasts from steam exits 9; the larger lumps of coal ride down the ridges and as they drop from the lower ends come in range of the blasts from steam exits 8. The finer coal flows down the channels and, as it passes therefrom, comes in range of the blasts from steam exits 9. By applying a comparatively powerful blast to the coarse coal and a comparatively weak blast to the finer coal, a proper mingling and distribution of the coal in the fire box may be obtained. Any desired means may be employed for regulating the intensity of the blasts. When a single blast, or line of blast, is used a portion of the fine fuel is driven forwardly and upwardly and part of it goes into the flues. When the fine fuel is separated from the coarse and two lines of blast are used, an upper blast for the coarse fuel and a lower blast for the fine, the upper blast keeps the fine fuel down and prevents it from getting into the flues.

I claim as my invention:

1. The herein described method of feeding fuel, consisting in separating the coarse from the fine fuel and subjecting the coarse fuel to a comparatively powerful blast and the fine fuel to a comparatively weak blast.

2. The herein described method of feeding fuel consisting in separating the coarse from the fine fuel and projecting the products of the separation into the fire box by separate blasts, the blast for the fine fuel being below that for the coarse fuel.

3. The herein described method of feeding fuel consisting in separating the coarse from the fine fuel and subjecting the coarse fuel to a comparatively powerful blast and the fine fuel to a comparatively weak blast, the blast for the fine fuel being below that for the coarse fuel.

4. The herein described method of feeding fuel consisting in separating the coarse from the fine fuel and then subjecting the coarse fuel to one blast and the fine fuel to a separate blast.

5. The herein described method of feeding fuel consisting in separating the coarse from the fine fuel and also in subjecting the coarse fuel to one blast at one level and the fine fuel to a separate blast, at another level.

WILLIAM T. HANNA.

Witnesses:

THEO. W. MEADER,

CLARA STANNUS.